(12) United States Patent
Das et al.

(10) Patent No.: US 11,030,165 B2
(45) Date of Patent: Jun. 8, 2021

(54) METHOD AND DEVICE FOR DATABASE DESIGN AND CREATION

(71) Applicant: WIPRO LIMITED, Bangalore (IN)

(72) Inventors: Rishav Das, Howrah (IN); Karanjit Singh, Tarn-Taran (IN)

(73) Assignee: Wipro Limited, Bangalore (IN)

( * ) Notice: Subject to any disclaimer, the term of this patent is extended or adjusted under 35 U.S.C. 154(b) by 435 days.

(21) Appl. No.: 15/879,494

(22) Filed: Jan. 25, 2018

(65) Prior Publication Data

US 2019/0179926 A1 Jun. 13, 2019

(30) Foreign Application Priority Data

Dec. 11, 2017 (IN) .............................. 201741044446

(51) Int. Cl.
*G06F 16/00* (2019.01)
*G06F 16/21* (2019.01)
(Continued)

(52) U.S. Cl.
CPC ............ *G06F 16/212* (2019.01); *G06F 16/21* (2019.01); *G06F 16/213* (2019.01);
(Continued)

(58) Field of Classification Search
CPC ...... G06F 16/21; G06F 16/212; G06F 16/213; G06F 16/217; G06F 16/23; G06F 16/284; G06F 16/285; G06F 16/288
(Continued)

(56) References Cited

U.S. PATENT DOCUMENTS

| | | | |
|---|---|---|---|
| 9,037,536 B2 | 5/2015 | Vos et al. | |
| 9,558,245 B1 * | 1/2017 | Gao | ................... G06F 16/2465 |

(Continued)

FOREIGN PATENT DOCUMENTS

| | | |
|---|---|---|
| KR | 100558952 | 3/2006 |
| WO | WO 2016/075702 | 5/2016 |

OTHER PUBLICATIONS

"BladeLogic Database Automation: Drive dramatic improvements in speed, cost, and risk for your multi-vendor database environment", *BMC Software, Inc*, 2016, pp. 1-2.

*Primary Examiner* — Michelle N Owyang
(74) *Attorney, Agent, or Firm* — Finnegan, Henderson, Farabow, Garrett & Dunner, LLP (57) ABSTRACT

A method and device for database design and creation is disclosed. The method includes determining ranks for each of a plurality of variables in each of a plurality of databases based on at least one attribute associated with each of the plurality of variables. The method further includes arranging each of the plurality of variables in a sequence with respect to an associated database from the plurality of databases. The method includes computing a correlation coefficient between the plurality of variables across the plurality of databases based on the sequence of arrangement. The method further includes determining based on the correlation coefficient, whether a relationship exists between one or more of the plurality of variables across the plurality of databases. The method includes creating a database using the plurality of databases based on the relationship, when the relationship exists between the one or more of the plurality of variables.

11 Claims, 7 Drawing Sheets

(51) Int. Cl.
*G06F 16/28* (2019.01)
*G06F 16/23* (2019.01)

(52) U.S. Cl.
CPC .......... *G06F 16/217* (2019.01); *G06F 16/284* (2019.01); *G06F 16/285* (2019.01); *G06F 16/288* (2019.01); *G06F 16/23* (2019.01)

(58) Field of Classification Search
USPC .................................................. 707/600–899
See application file for complete search history.

(56) References Cited

U.S. PATENT DOCUMENTS

| | | | |
|---|---|---|---|
| 10,057,274 B1* | 8/2018 | Roundy | H04L 41/0893 |
| 2006/0101048 A1* | 5/2006 | Mazzagatti | G06F 16/2246 |
| 2007/0050394 A1 | 3/2007 | Sterling et al. | |
| 2007/0150471 A1* | 6/2007 | MacGregor | G06F 16/2462 |
| 2009/0043795 A1* | 2/2009 | Kenedy | G16H 50/20 |
| 2010/0070500 A1* | 3/2010 | Cui | G06F 16/25 |
| | | | 707/736 |
| 2011/0072052 A1* | 3/2011 | Skarin | G06F 16/22 |
| | | | 707/794 |
| 2013/0297543 A1* | 11/2013 | Treiser | G06Q 50/01 |
| | | | 706/45 |
| 2014/0289245 A1* | 9/2014 | Deshpande | H04L 41/14 |
| | | | 707/737 |
| 2018/0075160 A1* | 3/2018 | Plouet | G06Q 40/04 |

* cited by examiner

METHOD AND DEVICE FOR DATABASE DESIGN AND CREATION

TECHNICAL FIELD

This disclosure relates generally to database management and more particularly to method and device for database design and creation.

BACKGROUND

Most business sectors and organizations have transformed their paper work to digital means. The data are digitized and stored in a massive storage unit, such as, a database. There are several varieties of databases that store different kinds of information and data. Typically, these databases are developed and maintained using Database Management System (DBMS) tools. In most of the cases, the DBMS tools may require manual effort and constant human monitoring. Although conventional tools provide for automation of database applications, these tools still require human intervention to a large extent.

In present Information Technology (IT) infrastructure of many business organizations, database servicing business that provides designs for administration are relied upon. Each business demands different database designs based on its business needs. Such approach of employing service business may require human expertise to maintain, which may be costly.

Moreover, maintaining an organization database is expensive to manage as well as requires huge work force to provide 24/7 support. In some cases, overcoming manual errors in designing, querying, or maintaining may consume a lot of time to resolve the errors. Additionally, the volume of databases is growing exponentially in such a way that the complexity of maintaining and monitoring on a regular basis has become difficult.

In some cases of database development, improper assignment of primary key may create problem in transferring data to other system. Moreover, modifying or updating any data of a database without the proper primary key may damage relationships among relational database systems.

In some other cases, organization of data into relationship without an accurate normalization may affect data integrity. Lack of normalized tables in database design before database creation may result in inconsistencies and redundancies. Such problem may also create complexity in updating the data. Moreover, splitting data into many tables, based on relations for removing redundancies may cause excess usage of data storage.

By way of an example, consider a "Hospital" database that maintains patient and specialist information. The patient information may be maintained in patient database that may include patient name, patient address, contact number, and/or the like. The Patient database may have columns that store value for each of these fields. The specialist information may be maintained in a specialist database, and may include specialist name, specialist department, or specialist contact number. This data may not necessarily be included in the patient database, as such information does not describe a patient even though the patient may be treated by a specialist of the hospital. Moreover, joining the patient and specialist information in one table may cause inconsistencies while updating the table.

SUMMARY

In one embodiment, a method of database design and creation is disclosed. The method includes determining, by a database creation device, ranks for each of a plurality of variables in each of a plurality of databases based on at least one attribute associated with each of the plurality of variables. The method includes arranging, by the database creation device, each of the plurality of variables in a sequence with respect to an associated database from the plurality of databases. The method further includes computing, by the database creation device, a correlation coefficient between the plurality of variables across the plurality of databases based on the ranks and the sequence of arrangement. The method includes determining, by the database creation device, based on the correlation coefficient, whether a relationship exists between one or more of the plurality of variables across the plurality of databases. The method further includes creating, by the database creation device, a database using the plurality of databases based on the relationship, when the relationship exists between the one or more of the plurality of variables.

In another embodiment, a database creation device for database design and creation is disclosed. The database creation device includes a processor and a memory communicatively coupled to the processor, wherein the memory stores processor instructions, which, on execution, causes the processor to determine ranks for each of a plurality of variables in each of a plurality of databases based on at least one attribute associated with each of the plurality of variables. The processor instructions further cause the processor to arrange each of the plurality of variables in a sequence with respect to an associated database from the plurality of databases. The processor instructions cause the processor to compute a correlation coefficient between the plurality of variables across the plurality of databases based on the ranks and the sequence of arrangement. The processor instructions further cause the processor to determine based on the correlation coefficient, whether a relationship exists between one or more of the plurality of variables across the plurality of databases. The processor instructions cause the processor to create a database using the plurality of databases based on the relationship, when the relationship exists between the one or more of the plurality of variables.

In yet another embodiment, a non-transitory computer-readable storage medium is disclosed. The non-transitory computer-readable storage medium has instructions stored thereon, a set of computer-executable instructions causing a computer comprising one or more processors to perform steps comprising determining ranks for each of a plurality of variables in each of a plurality of databases based on at least one attribute associated with each of the plurality of variables; arranging each of the plurality of variables in a sequence with respect to an associated database from the plurality of databases; computing a correlation coefficient between the plurality of variables across the plurality of databases based on the ranks and the sequence of arrangement; determining based on the correlation coefficient, whether a relationship exists between one or more of the plurality of variables across the plurality of databases; and creating a database using the plurality of databases based on the relationship, when the relationship exists between the one or more of the plurality of variables.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
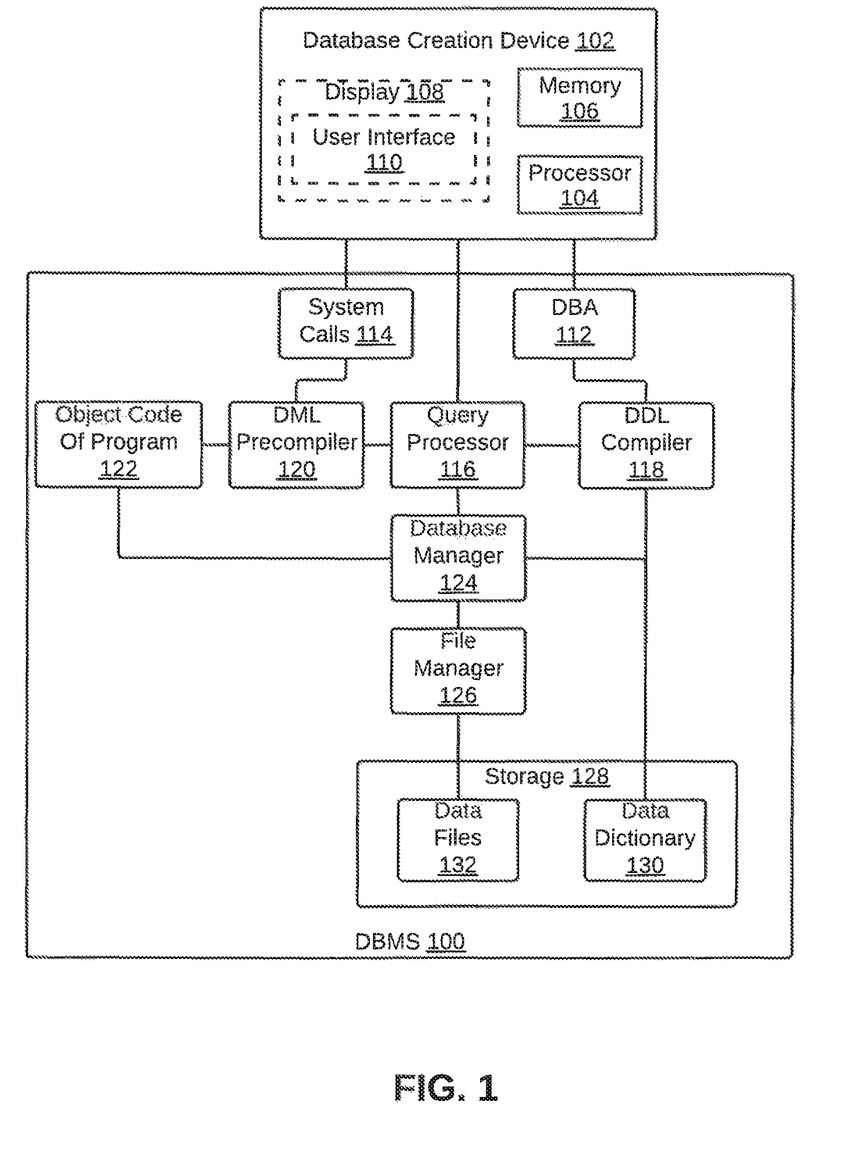
FIG. 1 is a block diagram illustrating a Database Management System (DBMS) in communication with a database creation device for database design and creation, in accordance with an embodiment.

Additional illustrative embodiments are listed below. In one embodiment, a block diagram of a Database Management System (DBMS) 100 in communication with a database creation device 102 for database design and creation is illustrated in FIG. 1. Database creation device 102 helps in designing and developing databases in a similar way a database administrator designs and develops. In a similar manner as a human database administrator, queries are provided by database creation device 102 in the design and development process of the database.

In order to design and create a database, database creation device 102 includes a processor 104 that is communicatively coupled to a memory 106, which may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include, but are not limited Dynamic Random Access Memory (DRAM), and Static Random-Access memory (SRAM).

Memory 106 further includes various modules that enable design and creation of a database. These modules are explained in detail in conjunction with FIG. 2. Database creation device 102 may further include a display 108 having a User Interface (UI) 110 that may be used by a user or an administrator to provide various inputs to database creation device 102. Display 108 may further be used to display results of designing and creating a database.

Database creation device 102 is communicatively coupled to DBMS 100. Database creation device 102 may communicate with DBMS 100 via a Database Administrator (DBA) 112. DBA 112 coordinates all activities of DBMS 100 and corresponds as per a business or an enterprise organization that has a good understanding of the business information resources and needs. DBA 112 performs multiple functions. One of the functions may be schema definition, where DBA 112 creates an original database schema by executing a set of data definition statements in Data Definition Language (DDL). Another function may be storage structure and access method definition, where DBA 112 defines data access methods as per their storage organization. A function of DBA 112 may be schema and physical organization modification, where DBA 112 carries out changes to the schema and physical organization to reflect the changing needs of the organization, or to alter the physical organization for improving performance.

Another function of DBA 112 may be granting user authority to access the database, where, by granting different types of authorization, the database administrator can regulate which parts of the database can be accessed by various users. A function of DBA 112 may be specifying integrity constraints to maintain data consistency. Another function of DBA 112 may be monitoring performance, such that, DBA 112 monitors the overall performance of database creation and maintenance to improve application availability and performance. Moreover, DBA 112 helps in responding to changes in requirements. Database creation device 102 also communicates via system calls 114 that passes information in terms of the system as requested by a user before creating queries. For example, the creation of a process or file creation, adding, or extracting.

Database creation device 102 communicates with a query processor 116 that helps in processing data set requests for fetching and manipulating data from a database. These processed requests are used by database creation device 102 for processing its query. Query processor 116 includes three parts (not shown in FIG. 1): a Data Definition Language (DDL) interpreter that interprets DDL statements and fetches definitions in the database and a Data Manipulation Language (DML) compiler that translates DML statements in a query language into low-level instructions that the query evaluation engine understands. A query may usually be translated into any number of alternative evaluation plans for same query result. The DML compiler selects the best plan for query optimization. The third part is a query evaluation engine that executes low-level instructions generated by the DML compiler.

Query processor 116 is further connected to a DDL compiler 118 that processes DDL commands by breaking down the DDL commands into a machine understandable code. Additionally, metadata information such as table name, table space used by a database, number of columns in a database, mapping information and/or the like are stored by DDL compiler 118. Query processor 116 is also connected to a DML pre-compiler 120 that converts DML statements embedded in an application program to normal procedure calls in a host language. DML pre-compiler 120 accepts requests for manipulating data in databases by parsing the requests and converting them into object codes. The data manipulative requests may include insertion, deletion, updating or the like, which may be sent as requests from buttons provided in a user interface. DML pre-compiler 120 further communicates with an object code of program 122 that includes object codes obtained from DML pre-compiler 120.

A database manager 124 in DBMS 100 behaves as a database control system that helps in breaking down queries received from query processor 116 into a machine understandable code with time sharing capabilities. Moreover, database manager 124 also helps in performing back-up and recovery of databases. Thus, database manager 124 provides primary functional responsibilities of a database management system. Further, a file manager 126 in DBMS 100 helps in the management of files as per storage configuration. All the data to be stored in a storage device is converted according to its configuration.

Data are organized as per DBA 112 and stored in a storage 128. The data storage and retrieval of data from storage 128 is performed by database manager 124. Storage 128 includes a data dictionary 130, which stores the metadata information obtained from DDL compiler 118. Storage 128 further includes data files 132. The organization of files by file manager 126 are captured and stored in data files 132.

Figure 2:
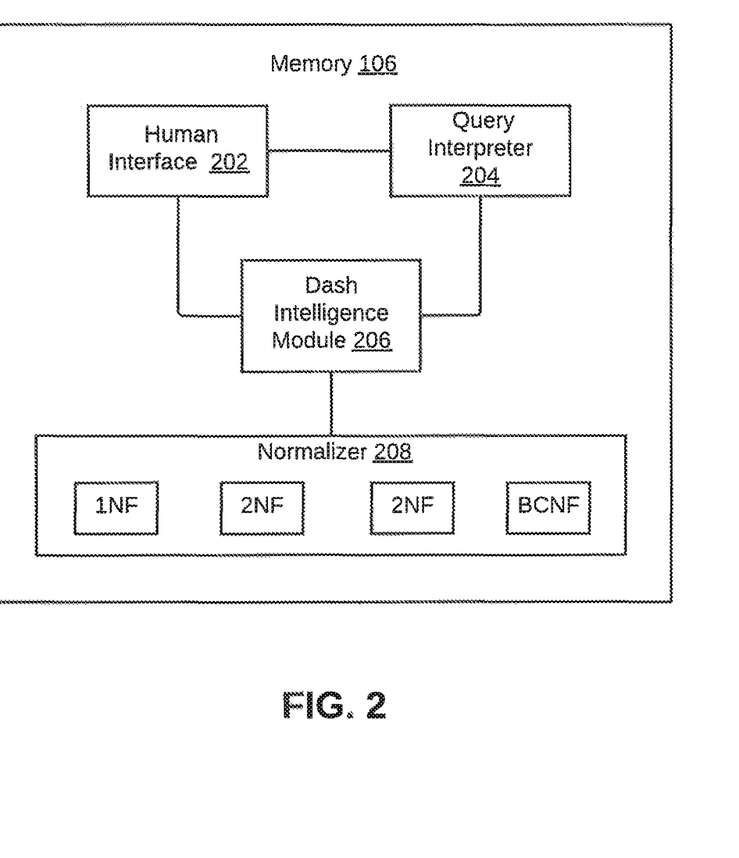
FIG. 2 is a block diagram illustrating various modules within a memory of a database creation device configured to design and create a database, in accordance with an embodiment.

Referring now to FIG. 2, various modules within memory 106 of database creation device 102 configured to design and create a database is illustrated, in accordance with an embodiment. Memory 106 includes a human interface 202, a query interpreter 204, a dash intelligence module 206, and a normalizer 208.

Human interface 202 receives inputs from an end user and is in communication with query interpreter 204, which accepts queries from human interface 202 and interprets the queries into a machine understandable form. The interpreted queries are used for designing database queries. By way of an example, a user may want to extract information from an employee database "EMP". A database query for finding all information based on selection of an employee name from the employee database may be represented as:

SELECT * from EMP WHERE EMPNAME="RISHAV" AND EMPNAME="KARAN"

The above query may be designed by query interpreter 204 based on user requests. If a user wants to update any database, then required data may be provided from human interface 202 using specific keywords. The keywords, for example, may include SELECT query along with add/update or remove/delete. By way of an example, for updating salary details of an employee using employee ID, following query may be provided:

UPDATE EMP SET SALARY=10000000 WHERE EMPID="11007398"

Dash intelligence module 206 has in-built intelligence, which helps to understand requirements of a user as per the business organization. By way of an example, medical organization may belong to different domains, such as, pharmaceutical domain or treatment domain. The pharmaceutical domain may further include data, such as, heart medicine table, or orthopedics medicine table.

Based on the specific domain, dash intelligence module 206 understands each entity within a database. Entities may be assigned a weightage as per their specific domain and undergo a clustering based on k-means clustering algorithm. In the clustering process, different attributes that are closer to one another are grouped corresponding to a specific domain entity.

Furthermore, dash intelligence module 206 provides logics to construct an entity relationship model and an extended entity relationship model. The required attributes are selected and entity relationship is determined based on a correlation analysis. The correlation analysis helps in generating accurate entity relationship and extended entity relationship models. The entity relationship and extended entity relationship models may be improved till the desired design is achieved through multiple iteration of the correlation analysis. The correlation analysis helps in finding relation between two variables and determines correct attributes as primary key, unique key, candidate key, or foreign key. The correlation analysis is explained in detail in conjunction with FIGS. 3 and 4.

Dash intelligence module 206 further communicates with normalizer 208 that provides normalization function such as First Normal Form (1NF), Second Normal Form (2NF), Third Normal Form (3NF) and Boyce-Codd Normal Form (BCNF). Performing normalization enables removal of anomalies and duplicates data that help in developing an efficient database. In 1NF normalization function, redundancy of data is eliminated and separate tables of related data sets are created. A unique identifier known as a primary key is determined in this normalization that helps to identify the related data set. The 1NF data may further be processed using a 2NF normalization function, if there are more redundancy and inconsistency of data. The 2NF normalization function enforces data to completely depend on the primary key obtained after applying the 1NF normalization function. There is no partial dependency of data on the primary key.

The 3NF normalization function ensures that there is no transitive functional dependency between data and the primary key. It removes values that are not dependent on the primary key. Lastly, in the BCNF normalization function data or group of data is completely functionally dependent on some other data. Once the normalization has been performed, dash intelligence module 206 is communicated to start developing a database.

Once database development is complete, dash intelligence module 206 configures DDL compiler 118, which then communicates with data dictionary 130. After completion of the configuration, dash intelligence module 206 manipulates (for example, inserts and deletes) according to the entity relationship models generated, using queries processed by query processor 116. Dash intelligence module 206 also enables database creation device 102 to perform DML operations through keyboard elements without any physical intervention. All these operations are performed via database manager 124, which helps query conversion into low-level machine code.

Figure 3:
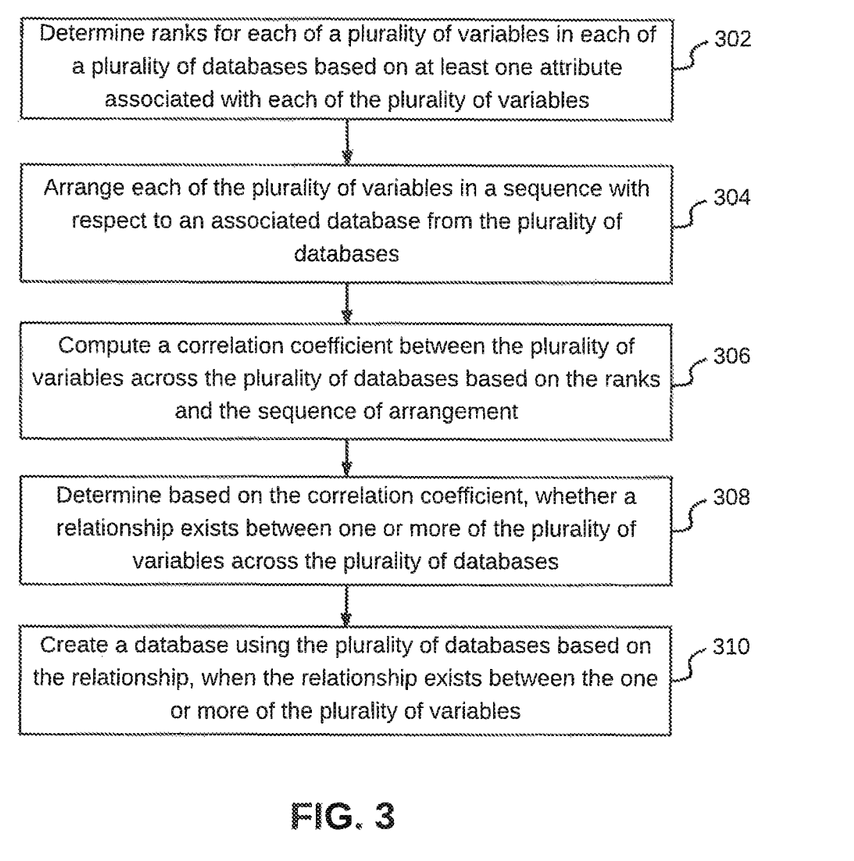
FIG. 3 illustrates a flowchart of a method for database design and creation, in accordance with an embodiment.

Referring now to FIG. 3, a flowchart of a method for database design and creation is illustrated, in accordance with an embodiment. Once database creation device 102 has access to a plurality of databases that need to be processed for design and creation of a new database, database creation device 102 performs a correlation analysis on the plurality of databases.

Each database in the plurality of databases includes a plurality of variables. By way of an example, an employee database in a company may include the following variables: Employee ID, Designation, Department, Business Unit, experience, and Salary. By way of another example, a Human Resource (HR) database in a company may include the following variables: Employee ID, reporting manager, current designation, number of people reporting, past performance ratings, policy violations, number of family members, insurance details, house address, past companies, college details, and salary. Each variable may further have one or more attributes associated with it. By way of an example, the variable of "past performance ratings" may have the following attributes: poor, meets expectations, average, good, excellent, and outstanding. By way of another example, for the variable "designation", attributes within a business organization or an enterprise may include, but are not limited to chairman, vice-Chairman, chief executive office, chief operating officer, and engineers.

In order to extract relevant data from the plurality of databases or to combine the plurality of databases in order to create a new database, database creation device 102, at step 302, determines ranks for each of a plurality of variables in each of the plurality of databases. The ranks may be determined based on one or more attributes associated with each of the plurality of variables. In an embodiment, the ranks may be determined as per priority and uniqueness of an attribute associated with a variable being ranked. In continuation of the example given above, the variable designation may be given the highest rank, when the associated attribute is "engineer" and lowest rank, when the associated attribute is "chairman." The reason being that chairman is followed by all the engineers, hence in the hierarchy table, all the employees of the organization will include chairman at the top. As a result, the number of existence/linkage for a chairman is always greater than any other employee in the organization. Similarly, in case of clerk or staff in the organization, the linkage/associativity/existence is always less.

Once the ranks for each of the plurality of variables in each of the plurality of databases has been determined, database creation device 102, at step 304, arranges each of the plurality of variables in a sequence with respect to an associated database from the plurality of databases. In other words, for a given database, the variables in that database are arranged based on the respective ranks determined for these variables in the database. By way of an example, two databases are considered, such that, a first database includes multiple variables, i.e., $x_i$ and a second database includes multiple variables, i.e., $y_i$. After ranks for the variables in each of the first database and the second database have been determined, the variables may be arranged as depicted in table 1, given below:

TABLE 1

| X | $R(x_i)$ | Y | $R(y_i)$ |
|---|---|---|---|
| $x_3$ | 3 | $y_6$ | 2 |
| $x_7$ | 10 | $y_8$ | 5 |
| $x_8$ | 5 | $y_1$ | 7 |
| $x_{10}$ | 4 | $y_3$ | 1 |
| $x_2$ | 7 | $y_2$ | 10 |
| $x_1$ | 8 | $y_5$ | 8 |
| $x_4$ | 1 | $y_{10}$ | 3 |
| $x_6$ | 2 | $y_4$ | 6 |
| $x_9$ | 9 | $y_7$ | 4 |
| $x_5$ | 6 | $y_2$ | 9 | where,
X represents the first database that includes 10 variables;
$x_1$ to $x_{10}$ represents the 10 variables in X;
$R(x_i)$ represents the rank assigned to a variable based on associated attributes;
Y represents the second database that also includes 10 variables;
$y_1$ to $y_{10}$ represents the 10 variables in Y; and
$R(y_i)$ represents the rank assigned to a variable based on associated attributes Based on the ranks and the sequence of arrangement, database creation device 102, at step 306, computes a correlation coefficient between the plurality of variables across the plurality of databases. In order to compute a correlation coefficient, difference between ranks of variables across the plurality of databases, which have the same sequence of arrangement, is computed. The difference is represented as: $\delta$. Additionally, a square of the difference is also computed and is represented as: $\delta^2$. In continuation of the example given above, the values of $\delta$ and $\delta^2$ computed for of R $(x_i)$ and R $(y_i)$ given in table 1 are represented in table 2 given below:

TABLE 2

| X | $R(x_i)$ | Y | $R(y_i)$ | $\delta$ | $\delta^2$ |
|---|---|---|---|---|---|
| $x_3$ | 3 | $y_6$ | 2 | 1 | 1 |
| $x_7$ | 10 | $y_8$ | 5 | 5 | 25 |
| $x_8$ | 5 | $y_1$ | 7 | -2 | 4 |
| $x_{10}$ | 4 | $y_3$ | 1 | 3 | 9 |
| $x_2$ | 7 | $y_2$ | 10 | -3 | 9 |
| $x_1$ | 8 | $y_5$ | 8 | 0 | 0 |
| $x_4$ | 1 | $y_{10}$ | 3 | -2 | 4 |
| $x_6$ | 2 | $y_4$ | 6 | -4 | 16 |
| $x_9$ | 9 | $y_7$ | 4 | 5 | 25 |
| $x_5$ | 6 | $y_2$ | 9 | -3 | 9 | where, $$\delta = R(x_i) - R(y_i)$$

The correlation coefficient is computed based on values of $\delta$ and $\delta^2$. In an embodiment, the correlation coefficient may be computed using equation 1 given below:

$$\rho = 1 - \frac{6 \sum \delta^2}{n(n^2 - 1)} \quad (1)$$

where,
'$\rho$' represents the correlation coefficient and is a non-parametric test, which is used to measure the strength of association between two variables;
'n' represents the number of variables considered for computing the correlation coefficient.

As an example of computing the correlation coefficient, referring back to table 2, value of n is 10, as 10 variables are considered for both the first and second databases and the value of $\Sigma \delta^2$ is 102. Thus, the correlation coefficient is computed using equation 2 given below:

$$\rho = 1 - \frac{6 * 102}{10(10^2 - 1)} \quad (2)$$

$$\rho = 0.38$$

Based on the correlation coefficient, database creation device 102, at step 308, determines whether a relationship exists between one or more of the plurality of variables across the plurality of databases or not. When value of the correlation coefficient is positive, it implies that one or more of the plurality of variables across the plurality of databases are related. Referring back to table 2, the value of correlation coefficient is 0.38, which is positive, thus indicating that one or more of the variables in the first database are related to one or more variables in the second database. This is further explained in detail in conjunction with FIG. 4. Thus, higher correlation coefficient indicates higher degree of relationship between variables in the first database and variables in the second database. In a scenario where the correlation coefficient is 1, it would indicate that all variables in the first database are related to all variables in the second database.

When the value of the correlation coefficient in zero, it implies that there is no correlation between the plurality of variables across the plurality of variables. In others words, there is no relation between the plurality of variables, whatsoever. However, when value of the correlation coefficient is negative, it implies that none of the plurality of variables across the plurality of databases are related based on the current sequence of arrangement of the plurality of variables across the plurality of databases. This is further explained in detail in conjunction with FIG. 4.

When a relationship exists between the one or more of the plurality of variables, then based on the relationship, database creation device 102, at step 310, creates a database using the plurality of databases. The creation of database is further explained in detail in conjunction with FIG. 5.

Figure 4:
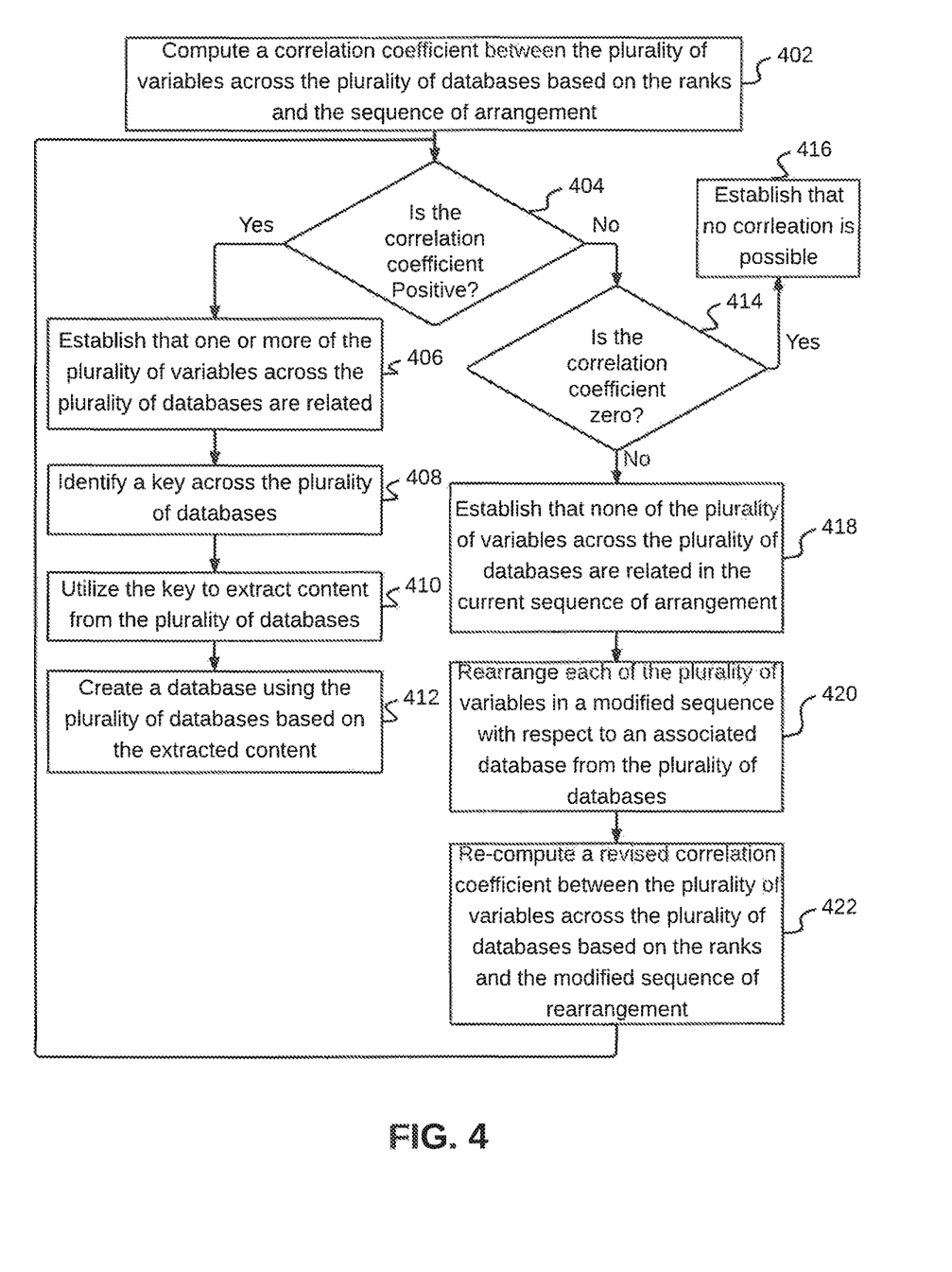
FIG. 4 illustrates a flowchart of a method of creating a database based on computation of a correlation coefficient between a plurality of variables across a plurality of databases, in accordance with another embodiment.

Referring to FIG. 4, a flowchart of a method of creating a database based on computation of a correlation coefficient between a plurality of variables across a plurality of databases is illustrated, in accordance with another embodiment. At step 402, a correlation coefficient between a plurality of variables across a plurality of databases is computed based on the ranks and the sequence of arrangement. This has been explained in detail in conjunction with FIG. 3.

At step 404, it is determined, whether the correlation coefficient is positive or not. If the correlation coefficient is positive, at step 406, it is established that one or more variables across the plurality of databases are related. By way of an example, a company may have an employee table that includes the following variables: Employee ID, Designation, Department, Business Unit, experience, and salary. The company may also include an HR table that includes the following variables: employee ID, reporting manager, designation, number of people reporting, past performance ratings, policy violations, number of family members, insurance details, house address, past companies, college details, and salary. Thus, when correlation analysis is performed for these two tables, as the variables of employee ID, designation, and salary, are common across these two databases, a correlation would be determined. In other words, the correlation coefficient for these two tables would be positive. The relationship established at step 406 also helps to understand the relationship of a primary key for an attribute of a particular variable, with the same attribute that is represented as a foreign key for other variable.

Thereafter, at step 408, a key is identified across the plurality of databases. The key, for example, may be one of a primary key, foreign key, unique key or the like. The key is utilized, at step 410, to extract content from each of the plurality of databases. By way of an example, for an entity "Employee," keys and attributes associated with "Employee" may include employee-id, name, age, gender, cell no, location). A rank is given to all these attributes on the basis of existence in other table, linkage with other tables, or duplicate values of the attributes. For a given attribute, if every value is uniquely identified across all the tables, higher precedent rank is given to that attribute, for example, in case of employee-id. At step 412, based on the extracted content, a database is created. The creation of database is further explained in detail in conjunction with FIG. 5.

Referring back to step 404, if the correlation coefficient is not positive, a check is performed, at step 414, to determine whether the correlation coefficient is zero. If the correlation coefficient is zero, at step 416, it is established that no correlation is possible between one or more of the plurality of variables across the plurality of databases. However, when the correlation coefficient is not zero or in other words, the correlation coefficient is negative, at step 418, it is established that none of the plurality of variables across the plurality of databases are related in the current sequence of arrangement.

Thereafter, at step 420, each of the plurality of variables are rearranged in a modified sequence with respect to an associated database from the plurality of databases. In other words, the sequence of arrangement of variables for a given database are modified. Based on the modified sequence of arrangement, at step 422, a revised correlation coefficient between the plurality of variables across the plurality of databases is re-computed. The revised correlation coefficient is computed using the equation 1 given in description of FIG. 3. Thereafter, the control goes back to step 404. Thus, the correlation coefficient is iteratively computed after rearranging variables across a plurality of databases, when the correlation coefficient is negative. This is repeated till value of the correlation coefficient is positive or is zero.

Figure 5:
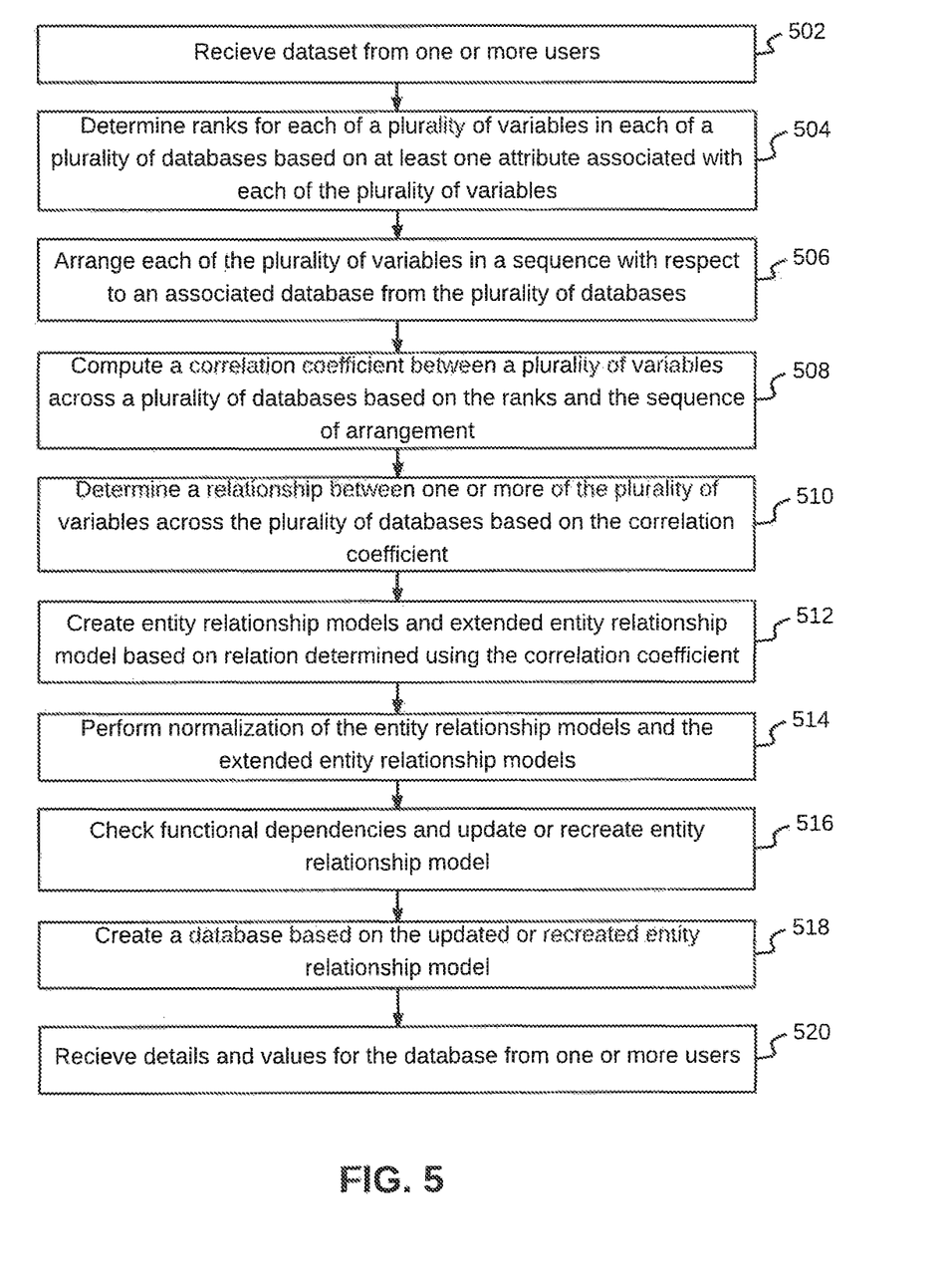
FIG. 5 illustrates a flowchart of a method for creating entity relationship models and extended entity relationship model, in accordance with an embodiment.

Referring to FIG. 5, a flowchart of a method for creating a database using entity relationship models and extended entity relationship models is illustrated, in accordance with an embodiment. At step 502, datasets are received from one or more users. The datasets may include a plurality of databases. A user may provide the dataset through human interface 202 associated with database creation device 102. Based on the datasets received from the one or more users, steps 504 to step 510 are performed. These steps have already been explained in detail in conjunction with FIG. 3. Thus, built-in intelligence provided dash intelligence module 206 enables identification of variables, entities, attributes, constraints and the like from the datasets provided by the one or more users. A variable may include both entities and attributes, such that, an entity may be a class for multiple attributes.

Based on relation determined using the correlation coefficient, entity relationship models and extended entity relationship models are created at step 512. In an embodiment, the entity relationship models and the extended entity relationship models may specifically be created based on the variables, entities, attributes, and constraints identified by dash intelligence module 206. Thereafter, at step 514, normalization of the entity relationship models and the extended entity relationship models may be performed. The normalization may be performed by dash intelligence module 206. The normalization techniques, for example, may include one or more of, but are not limited to 1NF, 2NF, 3NF, or BCNF. These normalization techniques have been explained in detail in conjunction with FIG. 2. Also, an exemplary embodiment depicting an entity relationship model is depicted in conjunction with FIG. 6.

Once normalization is complete, at step 516, functional dependencies among various attributes is checked and accordingly the entity relationship models are updated or recreated. At step 518, the database is created based on the updated or recreated entity relationship model. Once the database is created, the one or more users may be informed. In response, at step 520, details and values for the database may be received from the one or more users. These details are then stored in the database.

Once the database has been created, the database may be updated or modified by a user or any other operation may be performed on the database by the user. A user may send a request using human interface 202, which may be received by query interpreter 204. The request may be regarding updating the database. In response to the request, dash intelligence module 206 is triggered and prompts the user to provide relevant information for modifying, altering, inserting, or deleting certain content in the database. Based on the relevant information received from the user, dash intelligence module 206 performs the desired manipulation operation on the database. The user is thereafter automatically informed regarding completion of the operation.

Figure 6:
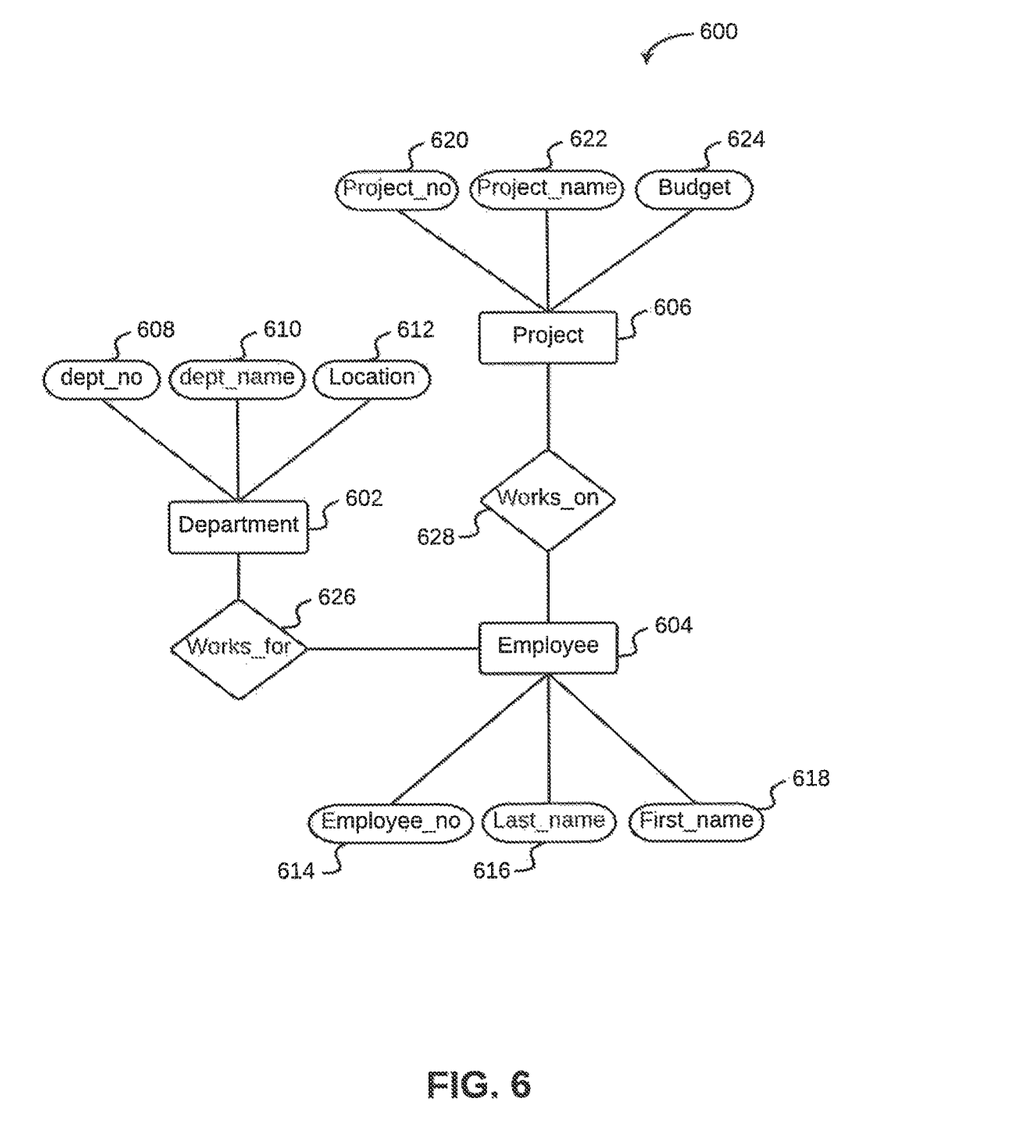
FIG. 6 illustrates an entity relationship map for an organization, in accordance with an exemplary embodiment.

Referring now to FIG. 6, an entity relationship map 600 for an organization is illustrated, in accordance with an exemplary embodiment. Entity relationship map 600 includes three entities, i.e., a department 602, an employee 604, and a project 606. Each of these three entities have associated attributes. The attributes associated with department 602 include a dept_no 608, a dept_name 610, and a location 612. The attributes associated with employee 604 include an employee_no 614, a last_name 616, and a first_name 618. Lastly, the attributes associated with project 606 include a project_no 620, a project_name 622, and a budget 624.

In entity relationship map 600, relationship between the three entities, i.e., department 602, employee 604, and project 606 is also defined. By way of an example, relationship between employee 604 and department 602 is defined by a relationship works_for 626. By way of another example, relationship between employee 604 and project 606 is defined by a relationship works_on 628.

Figure 7:
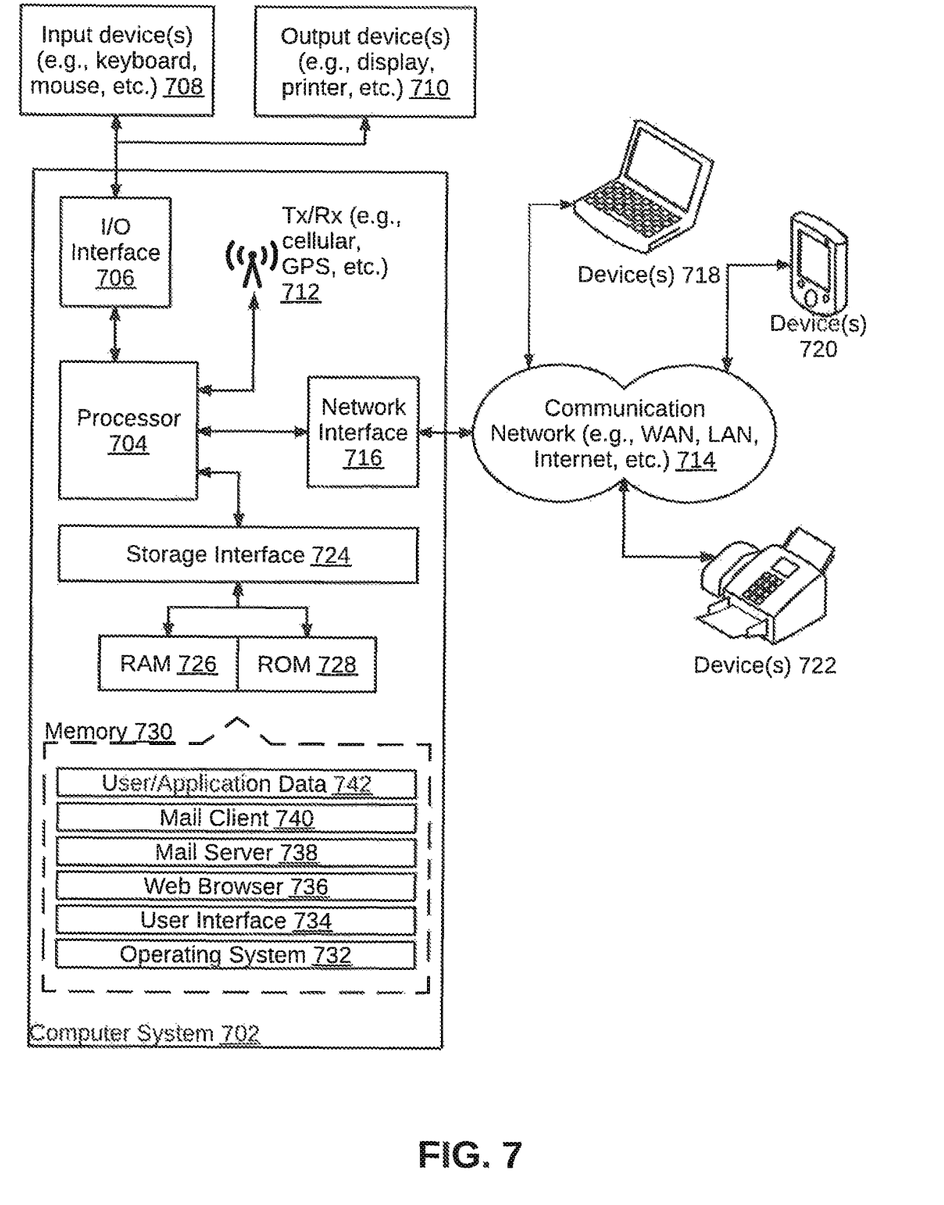
FIG. 7 illustrates a block diagram of an exemplary computer system for implementing various embodiments.

FIG. 7 is a block diagram of an exemplary computer system for implementing various embodiments. Computer system 702 may include a central processing unit ("CPU" or "processor") 704. Processor 704 may include at least one data processor for executing program components for executing user- or system-generated requests. A user may include a person, a person using a device such as such as those included in this disclosure, or such a device itself. Processor 704 may include specialized processing units such as integrated system (bus) controllers, memory management control units, floating point units, graphics processing units, digital signal processing units, etc. Processor 704 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 704 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 704 may be disposed in communication with one or more input/output (I/O) devices via an I/O interface 706. I/O interface 706 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 706, computer system 702 may communicate with one or more I/O devices. For example, an input device 708 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 710 may be a printer, fax machine, video display (e.g., cathode ray tube (CRT), liquid crystal display (LCD), light-emitting diode (LED), plasma, or the like), audio speaker, etc. In some embodiments, a transceiver 712 may be disposed in connection with processor 704. Transceiver 712 may facilitate various types of wireless transmission or reception. For example, transceiver 712 may include an antenna operatively connected to a transceiver chip (e.g., TEXAS® INSTRUMENTS WILINK WL1283® transceiver, BROADCOM® BCM4550IUB8 ® transceiver, INFINEON TECHNOLOGIES® X-GOLD 618-PMB9800® transceiver, or the like), providing IEEE 802.11a/b/g/n, Bluetooth, FM, global positioning system (GPS), 2G/3G HSDPA/HSUPA communications, etc.

In some embodiments, processor 704 may be disposed in communication with a communication network 714 via a network interface 716. Network interface 716 may communicate with communication network 714. Network interface 716 may employ connection protocols including, without limitation, direct connect, Ethernet (e.g., twisted pair 50/500/5000 Base T), transmission control protocol/internet protocol (TCP/IP), token ring, IEEE 802.11a/b/g/n/x, etc. Communication network 714 may include, without limitation, a direct interconnection, local area network (LAN), wide area network (WAN), wireless network (e.g., using Wireless Application Protocol), the Internet, etc. Using network interface 716 and communication network 714, computer system 702 may communicate with devices 718, 720, and 722. These devices may include, without limitation, personal computer(s), server(s), fax machines, printers, scanners, various mobile devices such as cellular telephones, smartphones (e.g., APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 702 may itself embody one or more of these devices.

In some embodiments, processor 704 may be disposed in communication with one or more memory devices (e.g., RAM 726, ROM 728, etc.) via a storage interface 724. Storage interface 724 may connect to memory 730 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 730 may store a collection of program or database components, including, without limitation, an operating system 732, user interface application 734, web browser 736, mail server 738, mail client 740, user/application data 742 (e.g., any data variables or data records discussed in this disclosure), etc. Operating system 732 may facilitate resource management and operation of computer system 702. Examples of operating systems 732 include, without limitation, APPLE® MACINTOSH® OS X platform, UNIX platform, Unix-like system distributions (e.g., Berkeley Software Distribution (BSD), FreeBSD, NetBSD, OpenBSD, etc.), LINUX distributions (e.g., RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 734 may facilitate display, execution, interaction, manipulation, or operation of program components through textual or graphical facilities. For example, user interfaces may provide computer interaction interface elements on a display system operatively connected to computer system 702, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (e.g., AERO® platform, METRO® platform, etc.), UNIX X-WINDOWS, web interface libraries (e.g., ACTIVEX® platform, JAVA® programming language, JAVASCRIPT® programming language, AJAX® programming language, HTML, ADOBE® FLASH® platform, etc.), or the like.

In some embodiments, computer system 702 may implement a web browser 736 stored program component. Web browser 736 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APis), etc. In some embodiments, computer system 702 may implement a mail server 738 stored program component. Mail server 738 may be an Internet mail server such as MICROSOFT® EXCHANGE® mail server, or the like. Mail server 738 may utilize facilities such as ASP, ActiveX, ANSI C++/C#, MICROSOFT.NET® programming language, CGI scripts, JAVA® programming language, JAVASCRIPT® programming language, PERL® programming language, PHP® programming language, PYTHON® programming language, WebObjects, etc. Mail server 738 may utilize communication protocols such as internet message access protocol (IMAP), messaging application programming interface (MAPI), Microsoft Exchange, post office protocol (POP), simple mail transfer protocol (SMTP), or the like. In some embodiments, computer system 702 may implement a mail client 740 stored program component. Mail client 740 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 702 may store user/application data 742, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (e.g., XML), table, or as object-oriented databases (e.g., using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments of the invention provide method and device for database design and creation. The solution enables improving database and its functional dependencies, normalization to a database system, and maintaining database and its querying. Database creation device 102 takes care of the administrative task, selects key constraints of its own, designs database as per customer required models and financial budget, resolves errors of its own and starts analyzing it, monitors the database at all time. Further, database creation device 102 uses efficient queries with fast resolutions, reduces human workload, requires less amount of expertise, and reduces the cost for service company and also for customers.

The specification has described method and device for database design and creation. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of database design and creation, the method comprising:
   determining, by a database creation device, ranks for each of a plurality of variables in each of a plurality of databases based on at least one attribute associated with each of the plurality of variables;

arranging, by the database creation device, each of the plurality of variables in a sequence of arrangement with respect to an associated database from the plurality of databases;

computing, by the database creation device, a correlation coefficient between the plurality of variables across the plurality of databases based on the ranks and the sequence of arrangement, wherein computing the correlation coefficient comprises identifying difference between the ranks for each of the plurality of variables across the plurality of databases, when the plurality of variables of a database is arranged in a same sequence of arrangement as the plurality of variables in another database, wherein the correlation coefficient measures the strength of association between two variables;

while the correlation coefficient is less than zero:
iteratively performing the arranging and the computing until the correlation coefficient is equal to or greater than zero;

determining, by the database creation device, when the correlation coefficient is positive, that a relationship exists between one or more of the plurality of variables across the plurality of databases; and creating, by the database creation device, a database using the plurality of databases based on the relationship, when the relationship exists between the one or more of the plurality of variables.

2. The method of claim 1, wherein determining that a relationship exists comprise identifying a key across the plurality of databases.

3. The method of claim 2, wherein creating the database comprises utilizing the key to extract content from the plurality of databases.

4. The method of claim 1 further comprising creating entity relationship models and extended entity relationship models based on the relationship determined using the correlation coefficient.

5. The method of claim 4 further comprising performing normalization of
the entity relationship models and the extended entity relationship models.

6. The method of claim 1, further comprising determining when the correlation coefficient is equal to zero, that none of the plurality of variables across the plurality of databases are related.

7. A database creation device for database design and creation, the database creation device comprising:
a processor; and
a memory communicatively coupled to the processor, wherein the memory stores processor instructions, which, on execution, causes the processor to:
determine ranks for each of a plurality of variables in each of a plurality of databases based on at least one attribute associated with each of the plurality of variables;
arrange each of the plurality of variables in a sequence of arrangement with respect to an associated database from the plurality of databases;
compute a correlation coefficient between the plurality of variables across the plurality of databases based on the ranks and the sequence of arrangement, wherein computing the correlation coefficient comprises identifying difference between the ranks for each of the plurality of variables across the plurality of databases, when the plurality of variables of a database is arranged in a same sequence of arrangement as the plurality of variables in another database, wherein the correlation coefficient measures the strength of association between two variables;
while the correlation coefficient is less than zero:
iteratively perform the arranging and the computing until the correlation coefficient is equal to or greater than zero;
determine when the correlation coefficient is positive, that a relationship exists between one or more of the plurality of variables across the plurality of databases; and
create a database using the plurality of databases based on the relationship, when the relationship exists between the one or more of the plurality of variables.

8. The database creation device of claim 7, wherein to determine that a relationship exists the processor instructions cause the processor to identify a key across the plurality of databases.

9. The database creation device of claim 8, wherein to create the database the processor instructions further cause the processor to utilize the key to extract content from the plurality of databases.

10. The database creation device of claim 7, wherein the processor instructions further cause the processor to create entity relationship models and extended entity relationship models based on the relationship determined using the correlation coefficient.

11. A non-transitory computer-readable storage medium having stored thereon, a set of computer-executable instructions causing a computer comprising one or more processors to perform steps comprising:
determining ranks for each of a plurality of variables in each of a plurality of databases based on at least one attribute associated with each of the plurality of variables;
arranging each of the plurality of variables in a sequence of arrangement with respect to an associated database from the plurality of databases;
computing a correlation coefficient between the plurality of variables across the plurality of databases based on the ranks and the sequence of arrangement, wherein computing the correlation coefficient comprises identifying difference between the ranks for each of the plurality of variables across the plurality of databases, when the plurality of variables of a database is arranged in a same sequence of arrangement as the plurality of variables in another database, wherein the correlation coefficient measures the strength of association between two variables;
while the correlation coefficient is less than zero:
iteratively performing the arranging and the computing until the correlation coefficient is equal to or greater than zero;
determining, when the correlation coefficient is positive, that a relationship exists between one or more of the plurality of variables across the plurality of databases; and
creating a database using the plurality of databases based on the relationship, when the relationship exists between the one or more of the plurality of variables.

* * * * *